United States Patent [19]
Davis et al.

[11] 3,815,014
[45] June 4, 1974

[54] COMPROMISE VOLTAGE CONTROL FOR TRACKING MULTIPLE OUTPUT POWER SUPPLY

[75] Inventors: James Howard Davis; Donald Rhea Dobson, both of Lexington, Tex.

[73] Assignee: International Business Machines Corporation, Armonk, N.Y.

[22] Filed: June 21, 1973

[21] Appl. No.: 372,128

[52] U.S. Cl. .................. 323/20, 307/33, 323/22 T, 323/DIG. 1
[51] Int. Cl. ............................................. G05f 1/46
[58] Field of Search ...... 219/483, 484, 485; 307/17, 307/31, 32, 33, 34, 310, 20; 323/17, 19, 22 SC, 22 T, 74, 100, DIG. 1

[56] References Cited
UNITED STATES PATENTS

| | | | |
|---|---|---|---|
| 3,191,068 | 6/1965 | Robb | 307/310 X |
| 3,584,291 | 6/1971 | Budniak et al. | 323/19 X |
| 3,671,853 | 6/1972 | Weischedel et al. | 323/17 |

*Primary Examiner*—A. D. Pellinen
*Attorney, Agent, or Firm*—John W. Girvin, Jr.

[57] ABSTRACT

A feedback control system is utilized to control the output voltage levels of a power supply having multiple output voltage signals which relatively track one another. This feedback control system encloses each output voltage signal within the feedback loop and allows independent definition of the tolerance of each voltage signal. Each output voltage signal is normalized and a percent error signal is obtained for each normalized voltage signal by comparison to a common voltage reference. The percent error signals are then weighted by factors which are inversely proportional to the defined tolerances for their associated voltage signals. An error control system is then responsive to the weighted percent error signals to control the output voltage levels of the power supply. In a first embodiment, the control system includes a summing network which provides a feedback correction signal to the power supply when the sum of the weighted percent error signals does not equal zero. In a second embodiment, the control system includes a switching network which provides a feedback correction signal to the power supply when the magnitude of the most negative weighted percent error signal does not equal that of the most positive weighted percent error signal.

3 Claims, 5 Drawing Figures

3,815,014

COMPROMISE VOLTAGE CONTROL FOR TRACKING MULTIPLE OUTPUT POWER SUPPLY

BACKGROUND OF THE INVENTION

1. Field

This invention relates to direct current power supplies having multiple output voltage signals and more particularly, to a closed loop feedback control system therefore.

2. Description of the Prior Art

Direct current power supplies having multiple output voltage signals often of differing magnitude have long been utilized as an efficiency measure to prevent wasteful duplication of parts inherent in separate power supplies. Such multiple output supplies have inherent output voltage tracking due to their common power source. However, this tracking is never perfect because of such controllable voltage drops uniquely associated with each output signal as those occasioned by load variations and, to a lesser extent, voltage drops occasioned by distribution losses and transformer and rectifier variations.

In the past, multiple output regulation has typically been achieved by tightly regulating a principal voltage signal, all other voltage signals being assumed to track the principal voltage signal within an acceptable tolerance. The primary disadvantage of this approach is that it does not correct for voltage variations occasioned by load changes on the non-principal voltage signal outputs since they are operated open loop.

Another prior art approach has been to incorporate a secondary feedback control loop with each non-principal voltage output signal in order to control wide fluctuations thereof. Such an approach is costly since it adds the cost of separate regulation to each output voltage signal. Further, tracking errors are not proportionally compensated for in the other non-principal output signals thereby occasioning large inefficiencies.

SUMMARY

In order to overcome the foregoing problems and shortcomings of the prior art and to provide a multiple output voltage supply which compensates for the transformer winding variations, rectifier differences, and distribution differences of each output signal while allowing the tolerance of each output signal to be independently defined and controlled, the control system of the present invention samples each output voltage signal of the multiple output voltage supply and provides a percent error signal associated with each output voltage signal which is independently weighted according to the differing tolerance requirements of each output signal. The weighted percent error signals are then utilized to achieve voltage regulation of the multiple output power supply in accordance with a compromise scheme which takes into account the actual variations of each output voltage signal. Two compromise schemes are utilized: a first scheme wherein the weighted percent error signals are summed and a feedback control signal is generated when the sum of such signals does not equal zero; and a second scheme wherein the magnitude of the most negative weighted percent error signal is matched to the magnitude of the most positive weighted percent error signal.

Accordingly, it is a principle object of this invention to enclose all of the uncontrollable voltage variations of all of the voltage output signals of a multiple output power supply within a feedback control loop to achieve the best possible compromise of output voltage values.

It is a further object of this invention to provide a closed loop control tolerance for each output signal of a multiple voltage output power supply.

A still further object of this invention is to provide an efficient multiple output voltage signal power supply wherein each output voltage signal is included within a feedback control loop utilized to control all of the voltage signals.

Another object of this invention is to establish a feedback control loop for a multiple output power supply which provides a regulation correction signal to the supply whenever the most negative voltage error signal differs from the most positive voltage error signal.

The foregoing objects, features, and advantages of the invention will be apparent from the following more particular description of the preferred embodiments of the invention as illustrated in the accompanying drawings.

IN THE DRAWINGS

DETAILED DESCRIPTION

Figure 1:
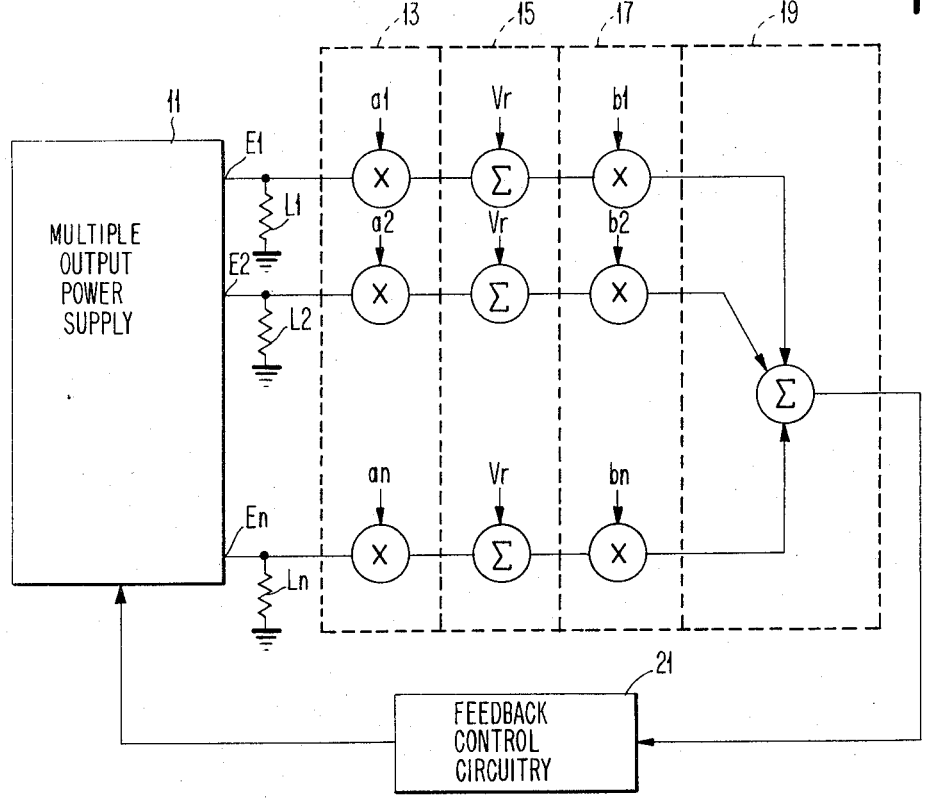
FIG. 1 is a block diagram of the essential functional elements of a compromise voltage control system of the present invention.

Referring now to the drawings, and more particularly to FIG. 1 thereof, a block diagram of the essential functional elements of a compromise voltage control system of the present invention is depicted. The compromise voltage control system is utilized in conjunction with a power supply 11 having multiple output voltage signals, E1, E2, ..., En. These output voltage signals have relative tracking properties due to the nature of their common power source.

The output voltage signals are applied to corresponding output loads, L1, L2, ... Ln. Typically, the loads may represent logical switching networks and driver circuits which individually vary over a wide range in accordance with the operation of the utilization device in which they are incorporated. Certain ones of the logical switching networks require closer regulation of their corresponding output voltage signal than do others. Additionally, certain ones of the loads vary over a much wider range than others. Accordingly, each output voltage signal can have a unique tolerance and load range associated therewith which is determined by the circuits with which it is utilized.

The compromise voltage control system of the present invention utilizes each of the output voltage signals to generate a feedback control signal which regulates the power supply 11. In generating the feedback control signal, each output voltage signal is weighted by an amount inversely proportional to the tolerances placed on the voltage signal by the logic designer. Since the voltage levels of various ones of the output voltage signals differ from one another, it is necessary to normalize each of the voltage signals E1–En in order that a percent error signal may be obtained. Accordingly, each of the output voltage signals is fed to a plurality of multiplier circuits 13 to effect normalization thereof, there being one voltage normalization function per output voltage signal. The multiplier circuits 13 multiply each output voltage signal by a multiplication factor which is inversely proportional to the magnitude of the output voltage signal so that the output signals of the multiplier circuits 13 all have the same nominal value.

Each of the output signals of the multiplier circuits 13 are fed to corresponding comparator circuits 15 whereat they are compared to a common reference voltage Vr. The difference in magnitude between the reference voltage Vr and each of the normalized voltage signals obtained from the multiplier circuits 13 represents the percent error of each associated voltage signal E. The percent error signals obtained from the comparator circuits 15 are then again normalized by a factor, $b$, which is inversely proportional to the required tolerance for that voltage signal. Multiplier circuits 17 effect such a normalization, there being one tolerance normalization function per output voltage.

The weighted or normalized percent error signal output of the multiplier circuits 17 are utilized to effect the generation of a feedback control signal in order to effect regulation of the power supply 11. Several feedback control systems can be utilized in accordance with the compromise desired between the various output voltage signals. In the system depicted in FIG. 1, each of the weighted percent error signals are summed by a summing circuit 19 which provides an output sum signal. The output sum signal is fed back through the feedback control circuitry 21 to the power supply 11. The sum signal is maintained at an average of zero by the feedback loop.

An insight into the operation of the compromise voltage control system may be obtained from the following example. Assume that the power supply 11 has two output voltage signals, E1 = +5 volts, ±10%; and E2 = +25 volts, ±20%. If, under extreme conditions a loading condition occurs which causes a 30 percent total tracking error, voltage signal E1 is caused to be 10 percent high and voltage signal E2 is caused to be 20 percent low by the feedback control system thereby keeping both voltage signals within their tolerance.

The compromise voltage control system is thus responsive to the voltage signal E1 which is equal to 5 volts plus or minus error 1 and to the voltage signal E2 which is 25 volts plus or minus error 2. As noted heretofore, the multiplier circuit 13 normalizes the two voltages. Accordingly, the multiplication factor $a1$ is equal to 1 and the multiplication factor $a2$ is equal to 1/5. After multiplication, the signal E1 is still 5 volts plus or minus error 1 and the signal E2 is 5 volts plus or minus error 2/5. The multiplier circuits 13 have thus normalized the voltages to 5 volts. The comparator circuits 15 then subtract a reference voltage from each of the output signals of the multiplier circuits 13. In the present example, the reference voltage is equal to 5 volts. Accordingly, after the 5 volt reference signal has been subtracted, all that is left of the signal which was initially E1 is plus or minus error 1 while plus or minus error 2/5 is left of the signal which was initially E2. The percent error signals are then multiplied by a weighting factor which is inversely proportional to the tolerance placed on the power supply by multiplier circuits 17. Accordingly, the multiplication factor $b1$ is equal to 1 while the multiplication factor $b2$ is equal to 1/2.

The output signals of the multiplier circuits 17 are now added by the summing circuit 19. The signal corresponding to voltage signal E1 is equal to plus or minus error 1 while the signal corresponding to voltage signal E2 is equal to plus or minus error 2/10. It is noted that it thus takes 2X percent error in the output voltage of voltage signal E2 to influence the feedback signal output of the summing circuit 19 as much as X percent error in the output signal of voltage signal E1. In absolute terms, it takes 10 units of error at the input to the summing circuit 19 corresponding to voltage signal E2 to have the same effect on the feedback signal as would be accomplished by one unit of error at the input to the summing circuit 19 corresponding to voltage signal E1.

The feedback control circuit 21 is responsive to the output signal of the summing circuit 19 and provides a control signal to the power supply 11 whenever the summing circuit 19 provides a non-zero output signal. Should the output signal of the summing circuit 19 be negative, the feedback control circuit provides a signal causing the power supply 11 to provide more output power and vice versa.

Figure 2:
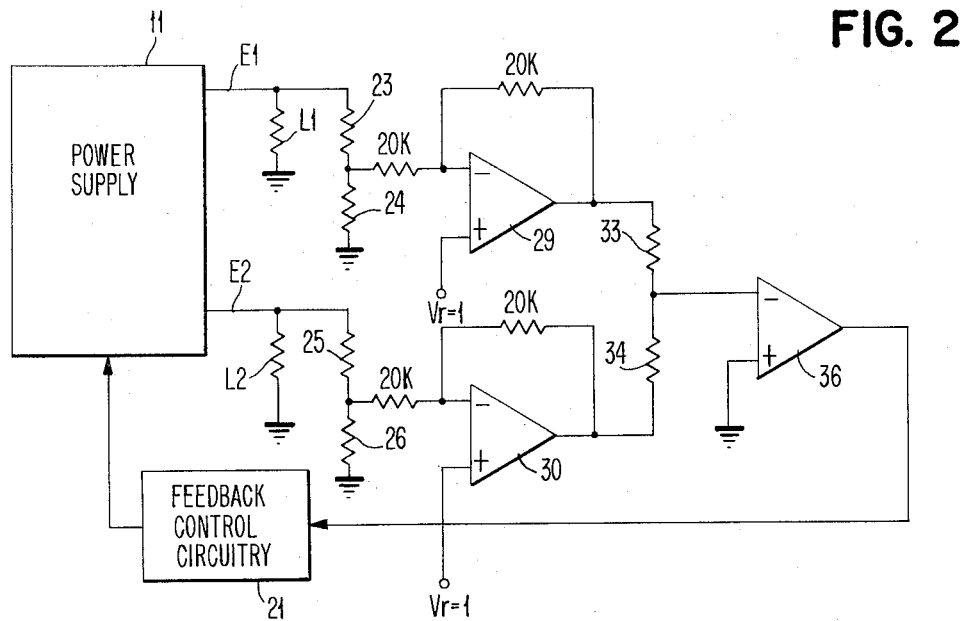
FIG. 2 is a circuit diagram of the compromise voltage control system of FIG. 1 for a multiple output level and multiple output tolerance voltage signal power supply.

Referring now to FIG. 2 of the drawings, a circuit diagram of a compromise voltage control system for a multiple output level and multiple output tolerance voltage signal power supply is depicted. The circuit diagram of FIG. 2 is an implementation of the example previously given in connection with the block diagram of FIG. 1 wherein output voltage E1 = 5 volts ±10 percent and output voltage E2 = 25 volts ±20 percent. Voltage signal E1 is normalized to 1 volt (instead of 5 volts in the foregoing example) by the resistors 23 and 24 while voltage signal E2 is normalized to 1 volt by the resistors 25 and 26. The normalized voltage signals are compared with a reference voltage of 1 volt by the operational amplifiers 29 and 30. The output signals of the operational amplifiers 29 and 30 representing the percent error signals are weighted by the voltage divider network formed of resistors 33 and 34 which provide the signals to the operational amplifier 36. This weighting is inversely proportional to the tolerances of the associated voltage signals. The output signal of the operational amplifier 36 is thus related to the value of the weighted input signal supplied thereto from the operational amplifiers 29 and 30.

In the circuit of FIG. 2, components have the following resistive values:

Resistor 23 ... 4k

Resistor 24 ... 1k

Resistor 25 ... 24k

Resistor 26 ... 1k

Resistor 33 ... 10k

Resistor 34 ... 20k

Figure 3:
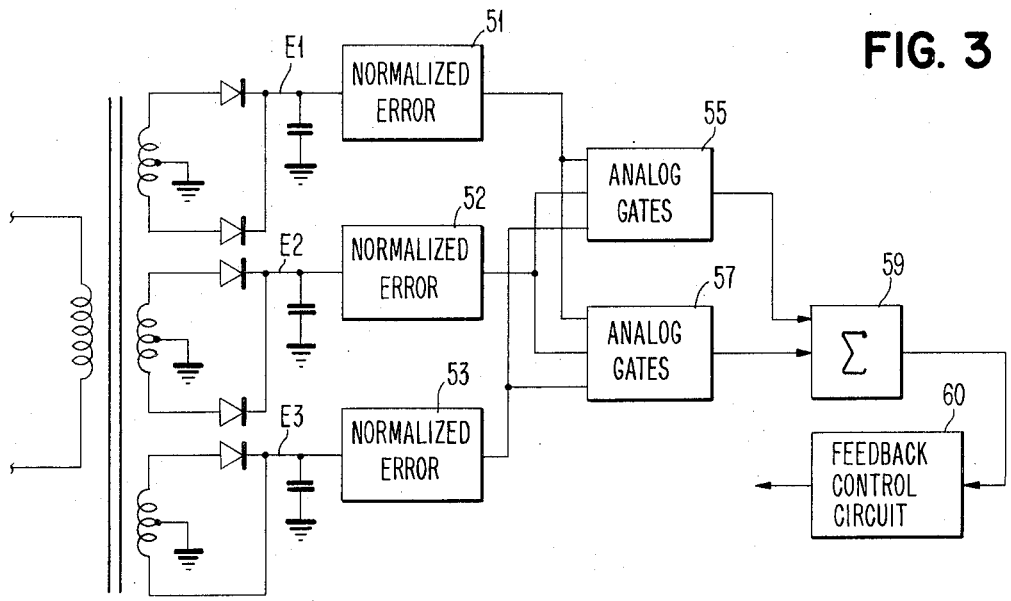
FIG. 3 is a block diagram of a still further compromise voltage control system of the present invention.

Referring now to FIG. 3 of the drawings, a block diagram of a still further compromise voltage control system of the present invention is depicted. As with the compromise voltage control system of FIG. 1, each of the output voltage signals of the power supply is normalized in magnitude and tolerance, but instead of being summed and the sum controlled to zero, the most positive error magnitude is matched to the most negative error magnitude. This system provides an improvement of the individual tolerances of the various output voltages for a fixed degree of output voltage signal tracking when there are more than two output voltage signals.

An insight into the operation of the compromise voltage control system of FIG. 3 and its advantage over the system described with respect to FIGS. 1 and 2 may be obtained from the following example: consider a power supply having three output voltage signals, E1, E2, and E3, each having a 10 percent tolerance requirement. If E1 is heavily loaded, E2 nominally loaded, and E3 lightly loaded, then E1 could be 10% low, E2 4% high, and E3 6% high. Should the signals be summed to zero as with the circuits of FIGS. 1 and 2, a satisfactory condition is indicated (note that the sum of the errors is 0: $-10 + 4 + 6 = 0$).

However, for the same tracking capabilities of the power supply, it is possible to adjust the input drive to achieve a better tolerance by causing the most negative percent error magnitude to match the most positive percent error magnitude. In this example, the input drive can be increased until voltage signal E1 is 8% low, voltage signal E2 is 6% high, and voltage signal E3 is 8% high. When such an adjustment is made, the percent error magnitude of voltage signal E1 is equal to that of voltage signal E3. Voltage signal E1 is no longer at its worse case tolerance, an effect achieved by increasing the magnitude of the percent error of voltage signals E2 and E3.

As noted heretofore, the output voltage signals of the power supply, E1, E2, and E3 are normalized in magnitude and tolerance by circuits 51, 52, and 53, each of which could comprise a multiplier circuit 13, a comparator circuit 15, and a multiplier circuit 17 of FIG. 1 of the drawings. The normalized percent error signals are then separated into the most positive and the most negative signals by the analog gates 55 and 57. The summing circuit 59 provides an output signal to the feedback control circuit 60 which regulates the power supply (not shown) whenever the magnitude of the most positive normalized percent error signal differs from that of the most negative normalized percent error signal.

Figure 4:
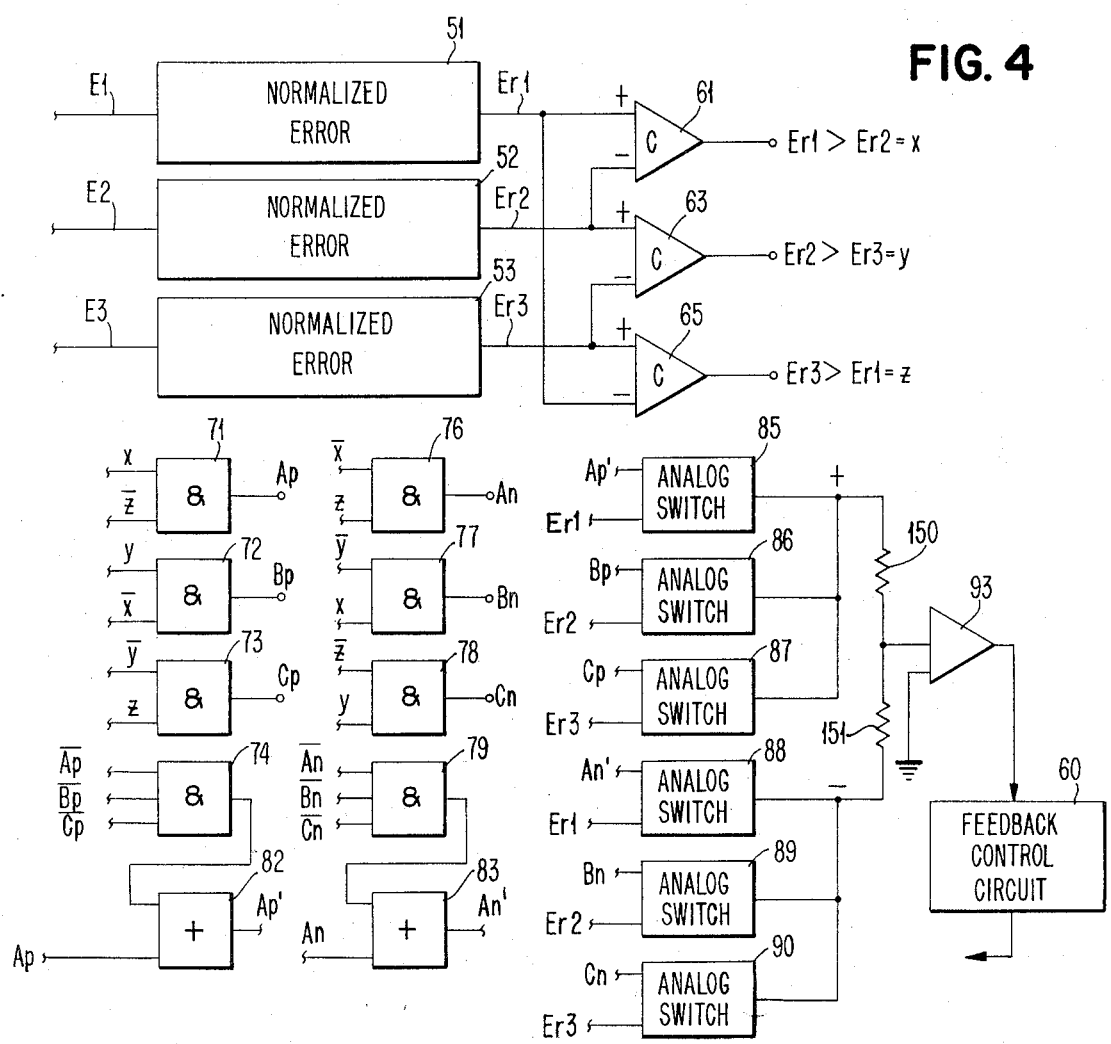
FIG. 4 is a circuit diagram of the switching logic of FIG. 3.

Referring now to FIG. 4 of the drawings, a circuit diagram of the switching logic of FIG. 3 is depicted. The output voltage signals of the power supply, E1, E2, and E3 are normalized in magnitude and tolerance by the circuits 51, 52, and 53. These circuits provide output signals Er1, Er2, and Er3 which represent the normalized percent error signals of the corresponding input voltages E1, E2, and E3 as heretofore described. Comparators 61, 63, and 65 provide three output signals, X, Y, and Z indicating respectively that signal Er1 is greater than signal Er2, that signal Er2 is greater than signal Er3, and that signal Er3 is greater than signal Er1. The output signals X, Y, and Z of the comparators 61, 63, and 65 are then gated by AND gates 71–74 which collectively provide an output signal indicating which of the signals Er1, Er2, Er3 is the most positive. The signals X, Y, and Z are also gated by the AND circuits 76–79 which collectively provide an output signal indicating which of the signals Er1, Er2, Er3 is the most negative. The OR gates 82 and 83 produce a signal indicating that the signal Er1 is both the most positive and the most negative signal when the comparators 61, 63, and 65 indicate that the signals Er1, Er2, and Er3 are equal or a signal indicating respectively, that Er1 is most positive or most negative.

The output signals of the AND circuits 72–73 and 77–78 and of the OR gates 82 and 83 are applied to the analog switches 85–90 and gate their associated normalized percent error signal therethrough. Thus, one of the analog switches 85–87 is actuated to gate the most positive normalized percent error signal therethrough while one of the analog switches 88–90 is actuated to gate the most negative normalized percent error signal therethrough. These two signals are then summed by the operational amplifier 93 which provides an output signal indicative of the difference between the most positive normalized percent error signal and the most negative normalized percent error signal. This analog output signal is then utilized to control the power supply of FIG. 5 in a manner to be described.

In the example given heretofore, the percent error signal associated with the voltage signal E1 was the most negative while that associated with the voltage signal E3 was the most positive. Accordingly, the normalized percent error signal Er1 was most negative while the normalized percent error signal Er3 was most positive. Thus comparator circuit 65 provides an output signal, Z, while comparator circuits 61 and 63 provide outer signals $\overline{X}$ and $\overline{Y}$. AND gate 73 then provides an output signal Cp and AND gate 76 provides an output signal An which causes OR gate 83 to provide an output signal An'.

The analog switch 87 is gated by the signal Cp allowing the normalized percent error signal Er3 to appear at the output side thereof and the analog switch 88 is gated by the signal An' allowing the normalized percent error signal Er1 to appear at the output side thereof. These signals, representative of the most positive and the most negative normalized percent error signals are then summed by the summer 93. Should they sum to zero, no feedback control signal appears at the output side of the summer 93. Should they sum to a non-zero condition, either a positive or negative voltage signal appears at the output side of summer 93 in accordance with the relative magnitudes of Er1 and Er3.

The AND gates 74 and 79 supply an output signal when the voltage signals E1, E2, and E3 all have the same normalized percent error. In this special situation, the voltage signal E1 is gated to the summer 93 and subtracted from itself. The output signal of the summer 93 is thus set to zero.

Figure 5:
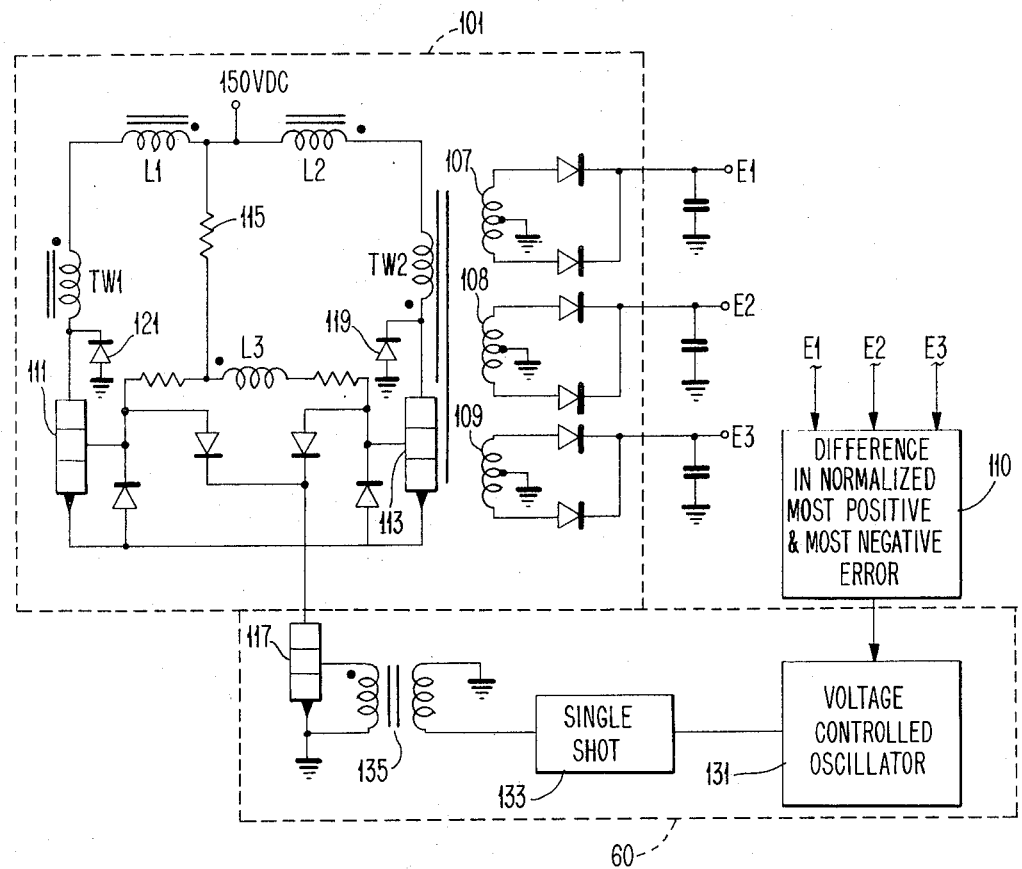
FIG. 5 is a detailed circuit diagram of a multiple output power supply and the feedback control circuit of the compromise voltage control system of FIG. 3.

Referring now to FIG. 5 of the drawings, a detailed circuit diagram of a multiple output power supply and the feedback control circuit of the composite voltage control system of FIG. 3 is depicted. The power supply 101 provides three output signals E1, E2 and E3 as previously described with respect to FIGS. 3 and 4. These output voltage signals will track since the secondary windings 107, 108, and 109 are closely coupled. The circuit 110 provides an output signal representative of the difference between the most positive normalized percent error signal and the most negative normalized percent error signal and corresponds to the blocks 51–59 of FIG. 3. This output signal is then supplied to the feedback control circuit 60 which produces an output signal which effects the regulation of the power supply 101.

Regulation of the output voltages of the power supply 101 is achieved through a frequency controlled switching regulation scheme which is incorporated within a power inverter type of power supply. That is, the frequency at which the switching regulator is operating will control the output voltage levels by way of controlling the output current levels. As will be described, the switching frequency is controlled by the feedback control circuit 60.

Transistors 111 and 113 which control the switching frequency are turned on alternately and fed by the base drive winding L3. This oscillator action is started by current which flows through resistor 115. Assuming that the current initially flows into the base of transistor 111, transistor 111 is turned on allowing the 150 volt DC supply to be dropped across windings L1 and TW1. TW1 is a primary winding of the transformer which will impose a voltage across the secondary windings 107, 108, and 109 thereby producing the output voltage signals. Assuming that the output voltage signals are within their normal values, approximately 50 volts is dropped across the winding TW1 leaving approximately 100 volts across the winding L1.

Current builds up through the winding TW1 at the rate of 100 volts/L1. The same current multiplied by the turns ratio is fed into the secondary windings 107, 108, and 109. When a signal is provided by transistor 117 of the feedback control circuit 60, transistor 113 is turned on and the base of transistor 111 is pulled to ground. The voltage at the collector of transistor 111 rises rapidly due to the polarity or dotting of winding TW1 and the voltage at the collector of transistor 113 will fall by an amount corresponding to the amount that the collector voltage of transistor 111 goes above 150 volts. Diode 119 is turned on when the collector of transistor 113 goes negative by approximately 1 volt and the energy which has been stored in winding L1 transfers to winding L2. This energy is equal to $\frac{1}{2} LI^2$.

Since windings L1 and L2 are closely coupled, the energy transferred through the winding L2 is equal to $\frac{1}{2} L2I^2$. The voltage dropped across winding L2 is approximately 200 volts and opposes the flow of current thereby taking energy out of the inductor L2. After all of the energy has been removed, the current starts building up in the opposite direction through winding L2. This current build up will create a 100 volt drop across winding L2 and a 50 volt drop across winding TW2 thereby causing a current build up through transistor 113, the base drive for which is provided by winding L3. As the current builds up, it is limited by the point at which transistor 117 is again turned on. When transistor 117 turns on, transistor 113 is turned off and the current which was flowing through winding L2 and winding TW2 now flows back through diode 121 through windings TW1 and L1.

By utilizing the frequency control switching regulation scheme, regulation is accomplished by switching transistors 111 and 113 and therefore controlling the amount of energy transferred to the secondary windings 107, 108, and 109. The amount of primary current build up is determined by the time which 100 volts is dropped across the winding L2. This current is multiplied by the turns ratio to give the output current. If the switching of the transistors 111 and 113 occurs at a faster rate, the current build up in the primary windings TW1 and TW2 will be less and therefore there will be less current transferred to the secondary windings 107, 108, and 109. The frequency of transistor switching is controlled by the feedback control circuit 60. Since the secondary current controls the output voltage signals E1, E2, and E3 depending on their loads, the object of the feedback control circuit is to make the average primary current times the turns ratio equal to the load current or the desired output voltage divided by the load resistance.

As heretofore described, the circuit 110 provides a signal representative of the difference between the most positive normalized percent error signal and the most negative normalized percent error signal of the three output voltage signals E1, E2, and E3. If the magnitude of the most positive normalized percent error signal exceeds that of the most negative normalized percent error signal, then the voltage controlled oscillator 131 oscillates at a higher frequency. The output of the voltage controlled oscillator 131 fires a single shot 133, the output signal of which is applied through the pulse transformer 135 to control the turn off of the transistor 117. As the frequency of the voltage controlled oscillator is increased, more pulses appear through the pulse transformer 135 and therefore less current is allowed to build up in the primary windings and hence the secondary windings of the power supply 101.

If the magnitude of the most negative normalized percent error signal exceeds the magnitude of the most positive normalized percent error signal, a negative voltage is fed into the voltage controlled oscillator 131 and its frequency is decreased thereby allowing more primary current to build up in the power supply 101 causing more current to be transferred to the secondary wingings 107, 108, and 109.

The single shot 133 produces a short pulse width signal which effects the turn on of transistor 117 for a desired length of time sufficient to accomplish the turning off of transistors 111 and 113.

Referring once again to FIG. 1 of the drawings, the operation of the voltage level control system has been described wherein each of the output voltage signals E1 ... En is first normalized to a common nominal value and thereafter compared with a reference voltage signal, the difference between the reference voltage signal and each of the nominal value signals being thereafter again normalized in accordance with the tolerance desired for that particular voltage output signal. As is appreciated by those skilled in the art, the identical result could be achieved by scaling the reference voltage signal in direct proportion to the nominal value of the various voltage signals E1 ... En and comparing the scaled reference voltage signals with the voltage signals to produce the percent error signals. Additionally, it is possible that each of the output signals of the multiple output power supply 11 have the same common nominal value. In this case, the multipliers a1 ... an of block 13 could be equal to unity. Further, should each of the output signals of the power supply 11 have the same tolerance requirement, the multipliers b1 ... bn would have a common value which could be equal to unity.

As is also appreciated by those skilled in the art, various other compromise schemes could be utilized to achieve the best tolerances for a given utilization device. For example, negative tolerances could be weighted more than positive tolerances to minimize nominal load dissipation. This could readily be achieved by proportionally weighting the values of resistors 150 and 151 of FIG. 4 of the drawings.

Additionally, as is appreciated by those skilled in the art, the voltage level control system of the present invention is applicable for use with any multiple output power supply having inherent output voltage signal tracking. The specific power supply of FIG. 5 of the drawings produces output voltage signals which inherently track due to a common transformer coupling of that supply and could be used with the voltage level control system of FIG. 1 as well as that of FIG. 3. Other power supplies which include common series regulation schemes also produce inherent output voltage tracking and could be so utilized.

While the invention has been particularly shown and described with reference to the preferred embodiments thereof, it will be understood by those skilled in the art that the foregoing and other changes in form and details may be made therein without departing from the spirit and scope of the invention.

What is claimed is:

1. A voltage level control system for a power supply having a plurality of more than two output voltage signals which inherently track comprising:
   a plurality of percent error signal generating means each responsive to individual ones of the plurality of output voltage signals and to a reference voltage signal for providing a corresponding plurality of percent error signals, each of the percent error signals being proportional to the difference in magnitude between the reference voltage signal and its corresponding output voltage signal;
   a plurality of voltage multiplier means each for multiplying individual ones of the plurality of percent error signals by an individual one of a corresponding plurality of factors and for providing a corresponding plurality of multiplied percent error signals, each of said factors being inversely proportional to a predetermined tolerance uniquely associated with each corresponding output voltage signal;
   an error control system responsive to each of said multiplied percent error signals for providing an output difference signal as a function of each of said multiplied percent error signals said error control system including a plurality of gating circuits for selecting the most positive multiplied percent error signal and the most negative multiplied percent error signal and summing means for providing said output difference signal representative of the difference between said most positive multiplied percent error signal and said most negative multiplied percent error signal;
   feedback control means responsive to said output difference signal for controlling the level of the output voltage signals of the power supply, said feedback control means including a feedback loop for maintaining said difference signal at a nominal value of zero.

2. The voltage level control system set forth in claim 1 wherein each of said plurality of percent error signal generating means comprise a voltage multiplier means for multiplying one of said output voltage signals by a factor inversely proportional to the nominal magnitude of said one output voltage signal and for providing a corresponding multiplied output voltage signal;
   and a summing means responsive to said corresponding multiplied output voltage signal and to a reference voltage for providing an output percent error signal proportional to the difference in magnitude between the reference voltage signal and the corresponding multiplied voltage signal.

3. A voltage level control system for a power supply having a plurality of more than two output voltage signals which inherently track comprising:
   voltage normalizing means for normalizing each of said plurality of output voltage signals to a common nominal value and for providing a corresponding plurality of output normalized voltage signals;
   error signal generating means responsive to each of said plurality of output normalized voltage signals and to a reference voltage signal for providing a corresponding plurality of normalized error signals, each of said error signals being proportional to the difference in magnitude between the reference voltage signal and its corresponding normalized voltage signal;
   signal weighting means for weighting each normalized error signal by a factor inversely proportional to a predetermined tolerance uniquely associated with each corresponding output voltage signals and for providing a corresponding plurality of weighted normalized error signals;
   an error control system responsive to each weighted normalized error signal for providing a feedback control signal as a function of each of said weighted normalized error signals said error control system including a plurality of gating circuits for selecting the most positive weighted normalized error signal and the most negative weighted normalized error signal and summing means for providing an output difference signal representative of the difference between said most positive weighted normalized error signal and said most negative weighted normalized error signal;
   feedback control means responsive to said output difference signal for controlling the level of the output voltage signals of the power supply, said feedback control means including a feedback loop for maintaining said difference signal at a nominal value of zero.

* * * * *